(12) United States Patent
Liu

(10) Patent No.: US 11,254,017 B1
(45) Date of Patent: Feb. 22, 2022

(54) MECHANICAL POSITIONING STRUCTURE

(71) Applicant: TRIPLE WIN TECHNOLOGY (SHENZHEN) CO. LTD., Shenzhen (CN)

(72) Inventor: Song-Hao Liu, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/122,432

(22) Filed: Dec. 15, 2020

(30) Foreign Application Priority Data

Nov. 27, 2020 (CN) .......................... 202011365009.4

(51) Int. Cl.
| | |
|---|---|
| *B25J 17/00* | (2006.01) |
| *B25J 17/02* | (2006.01) |
| *F16H 19/08* | (2006.01) |
| *B25J 9/10* | (2006.01) |

(52) U.S. Cl.
CPC .......... *B25J 17/0258* (2013.01); *B25J 9/108* (2013.01); *B25J 9/1035* (2013.01); *F16H 19/08* (2013.01)

(58) Field of Classification Search
CPC ...... B25J 9/108; B25J 9/1035; B25J 17/0258; B25J 19/08
USPC ............................................ 901/18; 74/89.19
See application file for complete search history.

(56) References Cited

U.S. PATENT DOCUMENTS

| | | | | |
|---|---|---|---|---|
| 3,475,977 | A * | 11/1969 | Steinke ................... | F16H 27/04 74/66 |
| 4,490,724 | A * | 12/1984 | Bickman ............... | F16M 11/123 343/765 |
| 4,878,393 | A * | 11/1989 | Duta .................... | B25J 17/0275 74/490.06 |
| 5,533,418 | A * | 7/1996 | Wu .......................... | B25J 9/102 248/181.1 |
| 6,026,703 | A * | 2/2000 | Stanisic ............... | B25J 17/0266 464/106 |
| 11,110,604 | B2 * | 9/2021 | Jung ...................... | B25J 9/1679 |

FOREIGN PATENT DOCUMENTS

| | | | |
|---|---|---|---|
| CN | 107089274 | * | 8/2017 |
| CN | 208670494 | * | 3/2019 |

\* cited by examiner

*Primary Examiner* — William C Joyce
(74) *Attorney, Agent, or Firm* — ScienBiziP, P.C.

(57) ABSTRACT

A mechanical positioning structure includes a first positioning mechanism, a fixing post arranged through a central axis of the first positioning mechanism, a first driving mechanism, a second positioning mechanism rotationally arranged on the fixing post and coupled to the first driving mechanism, a second driving mechanism, and a platform. One end of the first driving mechanism is fixed on the fixing post. Another end of the first driving mechanism is slidably arranged on the first positioning mechanism. The second driving mechanism is arranged on the second positioning mechanism. The platform is arranged on the second driving mechanism. The first driving mechanism drives the second positioning mechanism to move on a surface of the first positioning mechanism and rotate the second positioning mechanism around the fixing post. The second driving mechanism drives the platform to move on the second positioning mechanism.

19 Claims, 4 Drawing Sheets

MECHANICAL POSITIONING STRUCTURE

FIELD

The subject matter herein generally relates to mechanical equipment, and more particularly to a mechanical positioning structure.

BACKGROUND

Generally, automated manipulators operate in regular planes or spaces where regular planes are superimposed. However, automated manipulators have limited operating directions and cannot meet the needs of workpiece operations in any direction in space, resulting in insufficient space utilization.

BRIEF DESCRIPTION OF THE DRAWINGS

Implementations of the present disclosure will now be described, by way of embodiments, with reference to the attached figures.

DETAILED DESCRIPTION

Figure 1:
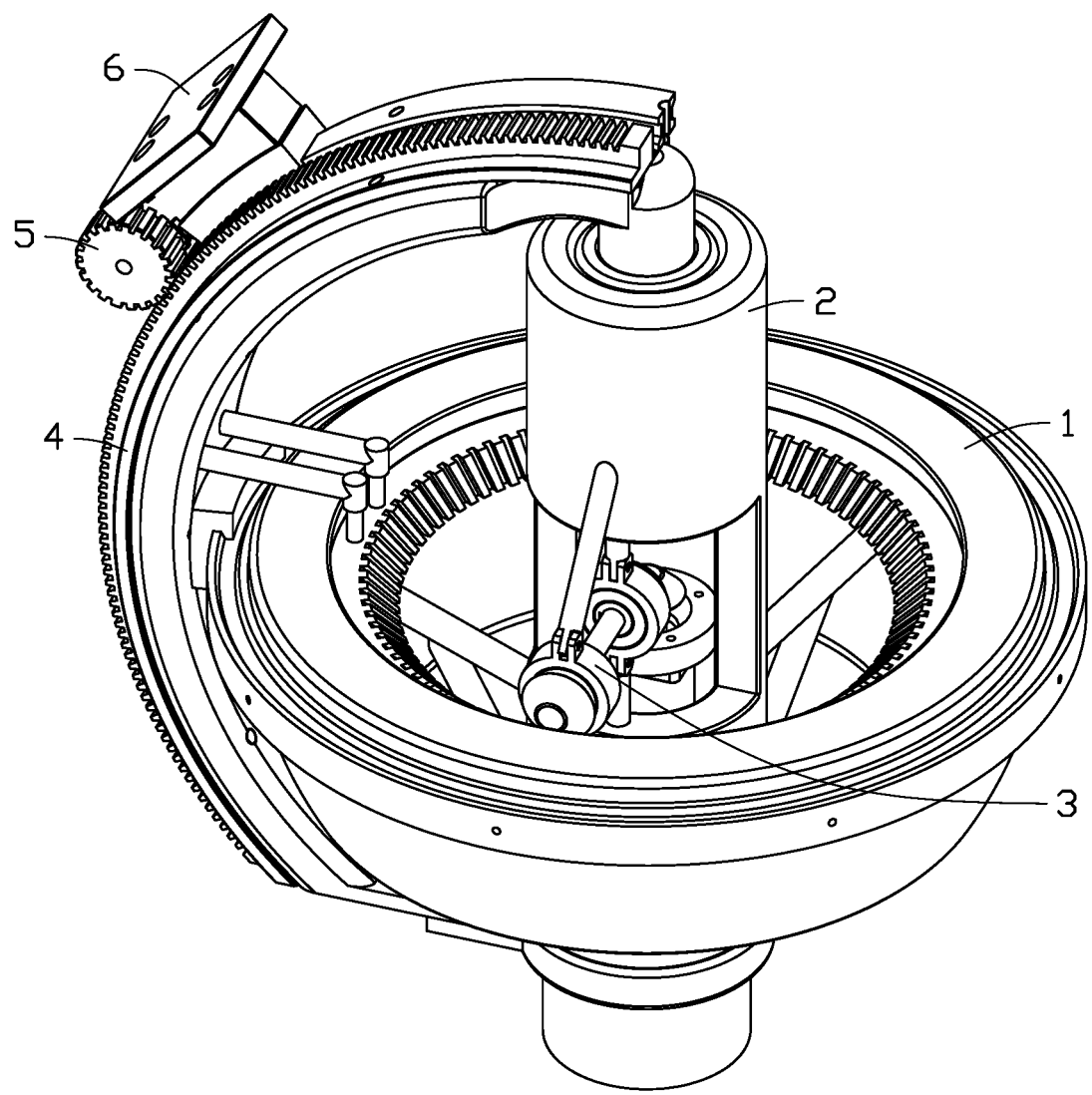
FIG. 1 is a perspective schematic diagram of an embodiment of a mechanical positioning structure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 shows an embodiment of a mechanical positioning structure 100. The mechanical positioning structure 100 includes a first positioning mechanism 1, a fixing post 2 arranged through a central axis of the first positioning mechanism 1, a first driving mechanism 3, at least one second positioning mechanism 4 rotationally arranged on the fixing post 2, a second driving mechanism 5 arranged on the second positioning mechanism 4, and a platform 6 arranged on the second driving mechanism 5.

The first positioning mechanism 1 is substantially a hollow hemispherical structure. One end of the first driving mechanism 3 is fixed on the fixing post 2, and another end of the first driving mechanism is slidably arranged on the first positioning mechanism 1. Each of the second positioning mechanisms 4 is rotationally arranged on the fixing post 2 and coupled to the first driving mechanism 3. The second positioning mechanism 4 is a convex arc structure arranged on an outer side of the first positioning mechanism 1 and protruding away from the first positioning mechanism 1. The first driving mechanism 3 is used to drive the second positioning mechanism 4 to move on a surface of the first positioning mechanism 1, thereby driving the platform 6 to move in a latitudinal direction while simultaneously driving the second positioning mechanism 4 to rotate around the fixing post 2. The second driving mechanism 5 is used to drive the platform 6 to move on the second positioning mechanism 4, thereby driving the platform 6 to move in a longitudinal direction.

Figure 2:
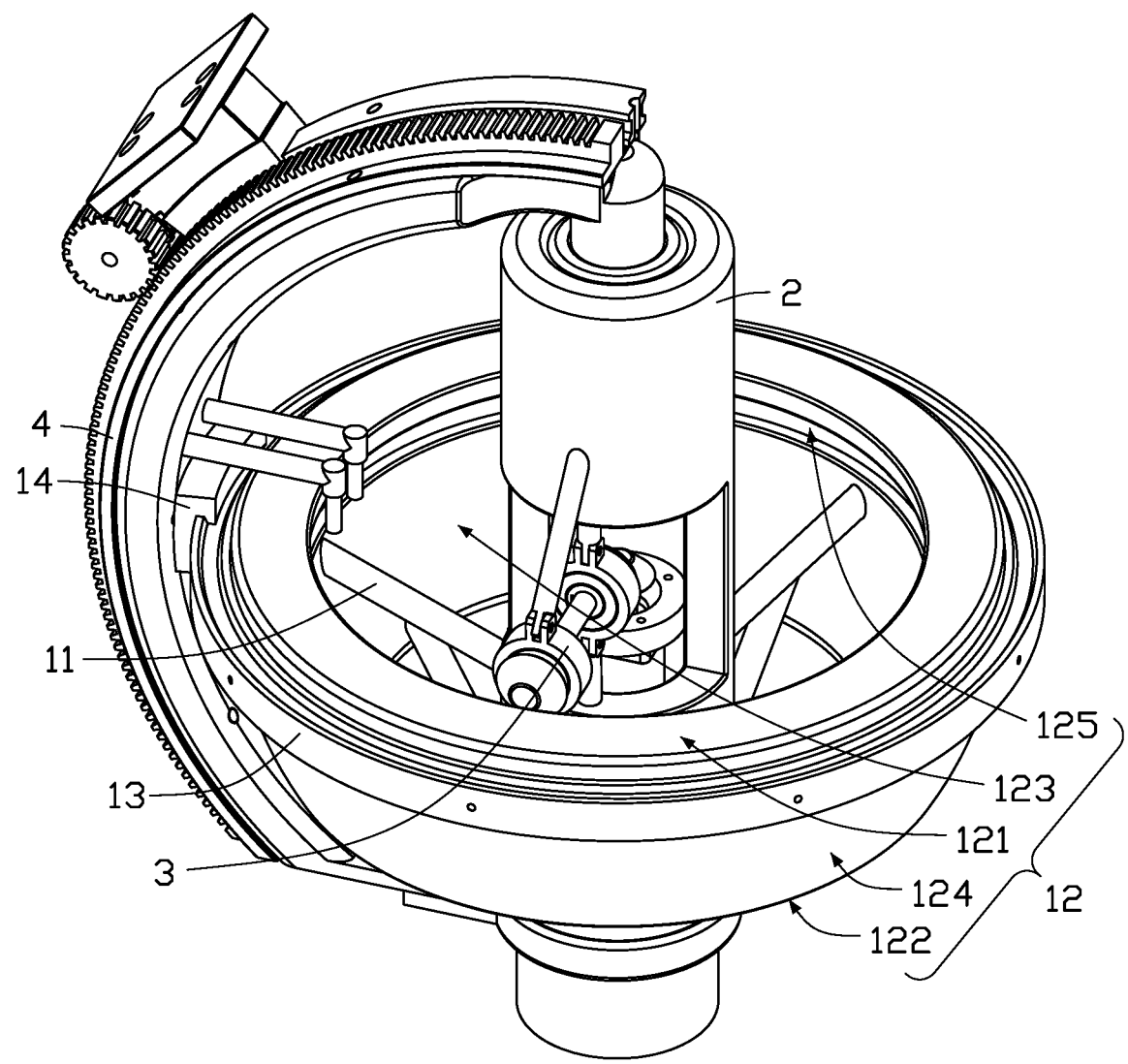
FIG. 2 is similar to FIG. 1, but having a second gear removed.

Referring to FIG. 2, the first positioning mechanism 1 includes a first fixing frame 11 arranged on the fixing post 2, a first fixing seat 12 arranged on the first fixing frame 11, a first guide rail 13 arranged on an outer wall of the fixing seat 12, and a first slider 14 slidably arranged on the first guide rail 13. The second positioning mechanism 4 is arranged on the first slider 14. The first driving mechanism 3 is used to drive the second positioning mechanism 4 to move along the first guide rail 13.

In one embodiment, the first fixing seat 12 is substantially a hollow hemispherical structure, and two ends of the fixing post 2 are respectively located at two poles of a sphere defined by the first fixing seat 12. The first fixing seat 12 includes a first planar surface 121 that is substantially perpendicular to the fixing post 2, a second planar surface 122 that is substantially parallel to the first planar surface 121, an inner spherical surface coupled to an inner edge of the first planar surface 121 and an inner edge of the second planar surface 122, and an outer spherical surface 124 coupled to an outer edge of the first planar surface 121 and an outer edge of the second planar surface 122. The first planar surface 121 is substantially parallel to a horizontal plane. One end of the first fixing frame 11 is fixed on the fixing post 2, and another end of the first fixing frame 11 is fixed on the inner spherical surface 123 for supporting and fixing the first positioning mechanism 1. The first guide rail 13 is substantially parallel to the first planar surface 121 and located on the outer spherical surface 124 and provides a running track in the latitudinal direction for the second positioning mechanism 4. The second positioning mechanism 4 moves on the first guide rail 13 on the outer spherical surface 124.

Figure 3:
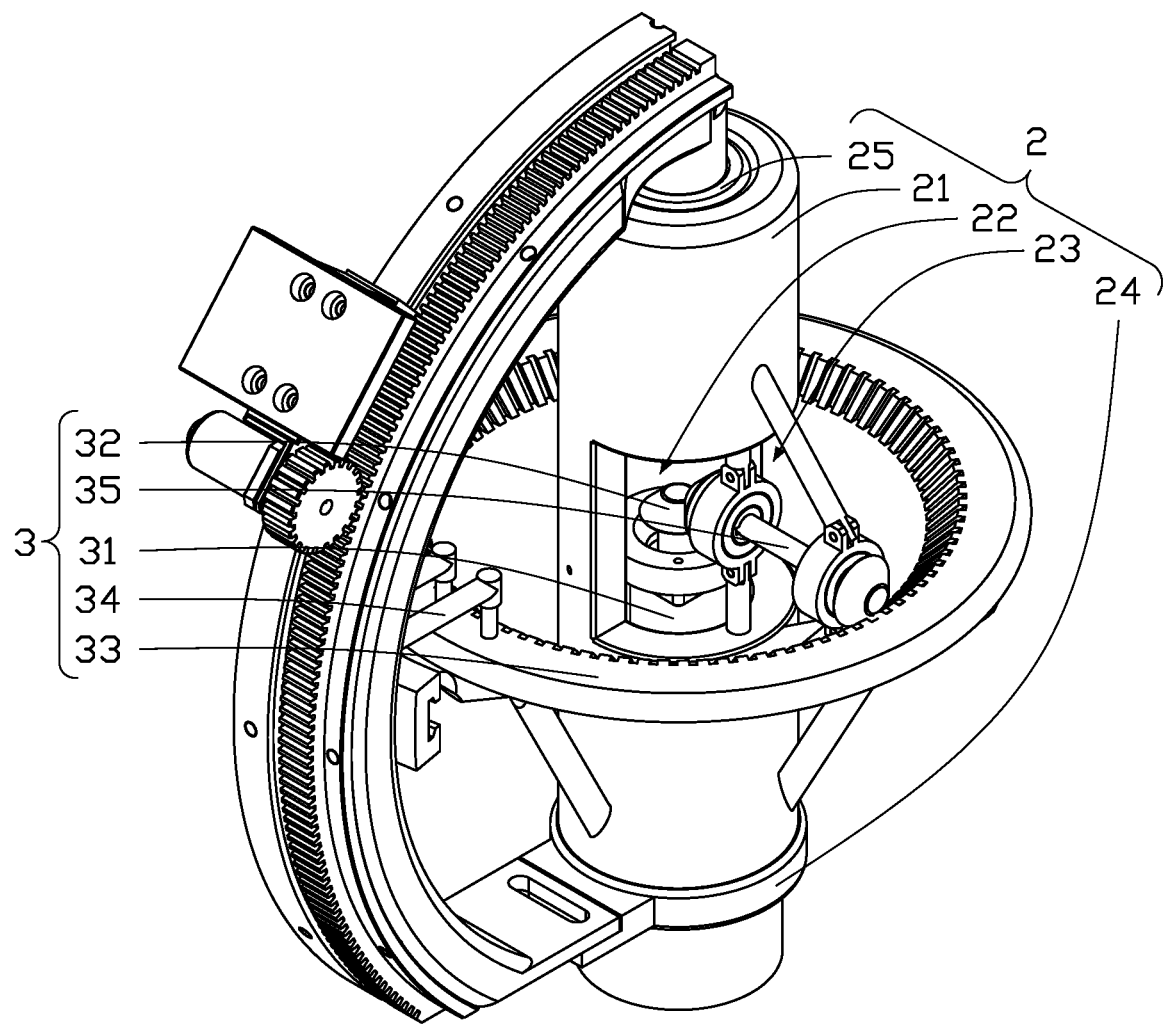
FIG. 3 is a schematic structural diagram showing cooperation between a fixing post and a first driving mechanism of the mechanical positioning structure.

Referring to FIG. 3, the fixing post 2 includes a fixing post body 21, a first bearing 24 provided at a bottom end of the fixing post body 21, and a second bearing 25 provided at a top end of the fixing post body 21. Two ends of the positioning mechanism 4 are respectively arranged on the first bearing 24 and the second bearing 25.

In one embodiment, the fixing post body 21 is substantially a hollow columnar structure, and a middle of the fixing post body 21 is provided with a hollow cavity 22. The first driving mechanism 3 is arranged in the hollow cavity 22 and extends from an opening 23 and is coupled to the first positioning mechanism 1.

Figure 4:
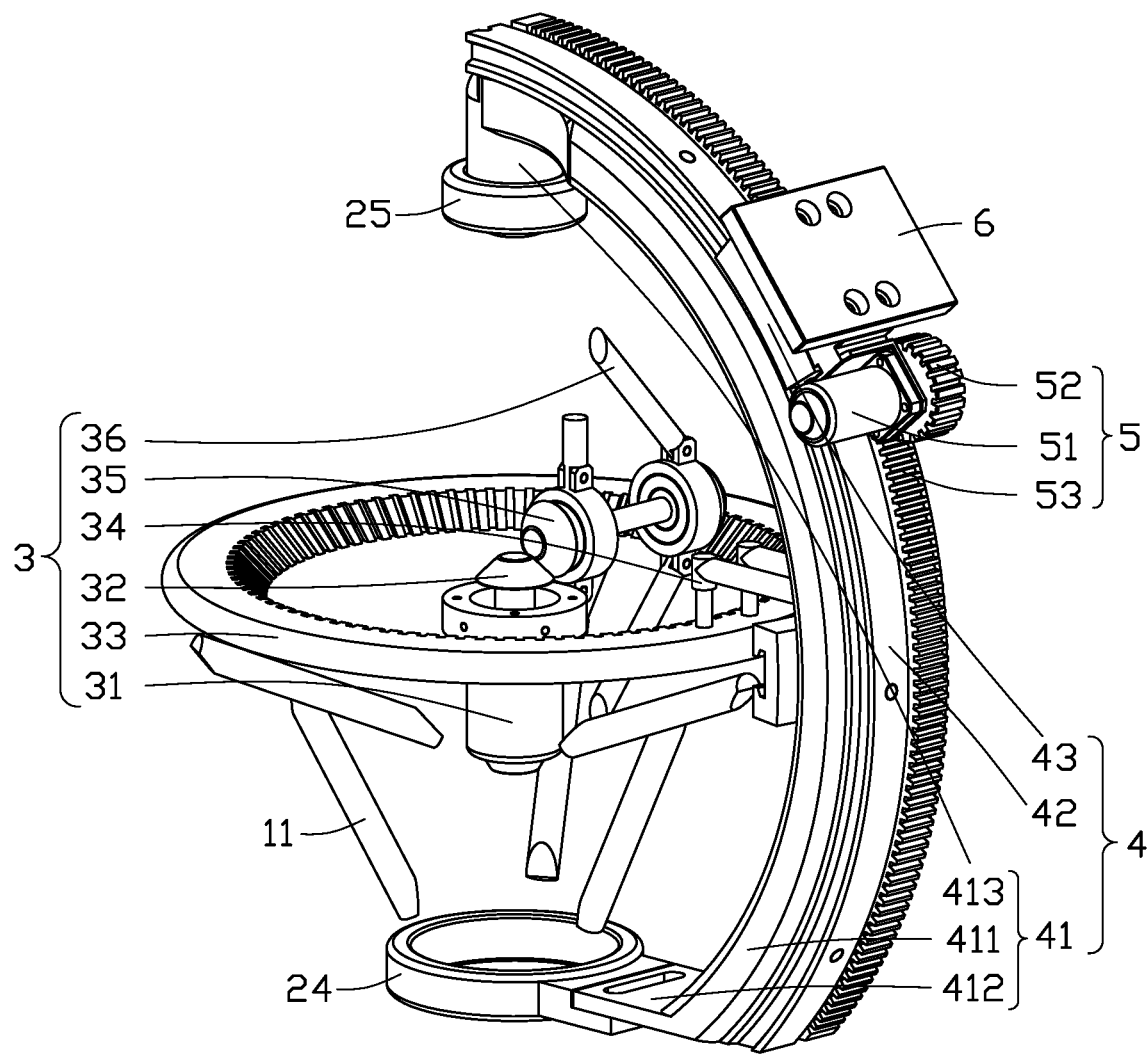
FIG. 4 is a schematic structural diagram of the first driving mechanism and a second positioning mechanism of the mechanical positioning structure.

Referring to FIGS. 3 and 4, the first driving mechanism 3 includes a first driving motor 31 arranged on the fixing post 2, a first gear 32 arranged on an output end of the first driving motor 31, a second gear 33 arranged on the first positioning mechanism 1, a connecting rod 34, and a transmission rod 35. One end of the connecting rod 34 is arranged on the second gear 33, and another end of the connecting rod 34 is arranged on the second positioning mechanism 4. The transmission rod 35 is fixed on the fixing post 2, and two ends of the transmission rod 35 are respectively meshed and engaged with the first gear 32 and the second gear 33. The first driving motor 31 drives the transmission rod 35 to rotate through the first gear 32 to drive the second gear 33 to drive the second positioning mechanism 4 to rotate around the fixing post 2.

In one embodiment, the first driving motor 31 and the first gear 32 are arranged in the hollow cavity 22, the second gear 33 is arranged on the inner spherical surface 123, the transmission rod 35 is arranged between the opening 23 and the second gear 33, and the transmission rod 35 is fixed on the fixing post body 21 by a fixing rod 36.

In one embodiment, a portion of the inner spherical surface 123 is recessed toward one side of the outer spherical surface 124 to define a sliding groove 125. The second gear 33 is arranged in the sliding groove 125 and slides along the sliding groove 125, thereby driving the second positioning mechanism 4 to move on the first positioning mechanism 1.

In one embodiment, the connecting rod 34 has a substantially L-shaped structure. One end of the L-shaped structure is fixed on the second gear 33, and another end of the L-shaped structure is fixed on the second positioning mechanism 4.

In one embodiment, two ends of the transmission rod 35 are respectively provided with gear structures (not labeled) that mesh and engage with the first gear 32 and the second gear 33, and the first gear 32, the second gear 33, and the gear structures at both ends of the transmission rod 35 are 45° helical gears. Thus, a force of the first driving motor 31 in a vertical direction is transmitted to a horizontal direction through cooperation of the 45° helical gears, thereby realizing a driving effect of the second positioning mechanism 4.

Referring to FIG. 4, the second positioning mechanism 4 includes a second fixing frame 41, a second guide rail 42 arranged on a surface of the second fixing frame 41, and a second slider 43 slidably arranged on the second guide rail 42 and rotationally coupled to the second driving mechanism 5. The second driving mechanism 5 is arranged on the second fixing frame 41. The platform 6 is arranged on the second slider 43. Under a driving force of the second driving mechanism 5, the second slider 43 can drive the platform 6 to move along the second guide rail 42.

In one embodiment, the second fixing frame 41 is substantially a semi-annular structure, and the second fixing frame 41 is arranged substantially perpendicularly to the first planar surface 121. The second fixing frame 41 includes a frame body 411, a fixing arm 412 arranged at a bottom end of the frame body 411, and a rotating shaft 413 arranged at a top end of the frame body 411. The fixing arm 412 is fixed on the first bearing 24, and the second bearing 25 is sleeved on the rotating shaft 413.

In one embodiment, the frame body 411 is a semi-annular structure protruding away from the first fixing seat 12, and one end of the connecting rod 34 and the first slider 14 are fixed to a surface of the frame body 411 adjacent to the first fixing seat 12. In order not to interfere with each other during movement, the connecting rod 34 is located above the first slider 14.

In one embodiment, the second guide rail 42 is also a semi-annular structure and is arranged on a surface of the frame body 411 away from the first fixing seat 12. The second guide rail 42 is substantially perpendicular to the first planar surface 121, thereby providing a running track for the platform 6 in the longitude direction.

Referring to FIG. 4, the second driving mechanism 5 includes a second driving motor 51, a driving gear 52 arranged at an output end of the second driving motor 51, and a gear track 53 meshed and coupled to the driving gear 52. The gear track 53 is arranged on a surface of the second fixing frame 41 and extends in a same direction as the second guide rail 42. The second slider 43 is rotationally arranged at an output end of the second driving motor 51. The second driving motor 51 drives the driving gear 52 to rotate and mesh with the gear track 53, thereby driving the platform 6 on the second slider 43 to move along the second guide rail 42.

In one embodiment, the gear track 53 and the second guide rail 42 are arranged side-by-side. The second driving motor 51 is located above the second guide rail 42 and is supported by the driving gear 52. The second slider 43 is sleeved on an output shaft of the second driving motor 51. The second driving motor 51 drives the driving gear 52 to rotate. The driving gear 52 meshes with the gear track 53 and moves along the gear track 53, thereby driving the second driving motor 51 and the second slider 43 to move along the second guide rail 42 to realize movement of the platform 6 on the second guide rail 42 in the longitudinal direction.

According to different requirements, different devices such as a grasping mechanism, a suction mechanism, a spraying mechanism, and a laser marking mechanism can be installed on the platform 6 to complete respective functions of the different devices.

In another embodiment, a quantity of the second positioning mechanism 4 can be increased, so that each branch of the second positioning mechanism 4 performs fine operations in a fixed area.

In one embodiment, a manipulator assembly (not shown) including a manipulator (not shown) is arranged on the platform 6.

In one embodiment, the manipulator can be a conventional rotation axis and a linear axis, which can realize functions of a common XYZ three-axis structure. For example, a rotation axis perpendicular to its own planar surface is added to the platform 6, and a linear axis is superimposed on the rotation axis.

Compared with the related art, the present application adopts a spherical positioning structure, and the guide rails are respectively arranged in the latitudinal and longitudinal directions of the sphere, so that the platform 6 can reach any position on the entire spherical surface, which satisfies the operation of workpieces in various directions in space and reduces a degree of space restriction, thereby greatly improving a space utilization rate.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A mechanical positioning structure comprising:
   a first positioning mechanism, the first positioning mechanism being a hollow partial spherical structure;
   a fixing post arranged through a central axis of the first positioning mechanism;
   a first driving mechanism, one end of the first driving mechanism fixed on the fixing post, and another end of the first driving mechanism slidably arranged on the first positioning mechanism;
   at least one second positioning mechanism, each of the second positioning mechanisms rotationally arranged on the fixing post and coupled to the first driving mechanism, the second positioning mechanism being an arc structure arranged outside the first positioning mechanism and protruding away from the first positioning mechanism;
   a second driving mechanism arranged on the second positioning mechanism; and
   a platform arranged on the second driving mechanism; wherein:
   the first driving mechanism is used to drive the second positioning mechanism to move on a surface of the first positioning mechanism and rotate the second positioning mechanism around the fixing post; and
   the second driving mechanism is used to drive the platform to move on the second positioning mechanism.

2. The mechanical positioning structure of claim 1, wherein:
   the first positioning mechanism comprises a first fixing frame arranged on the fixing post, a first fixing seat arranged on the first fixing frame, a first guide rail arranged on an outer wall of the fixing seat, and a first slider slidably arranged on the first guide rail; and
   the second positioning mechanism is arranged on the first slider.

3. The mechanical positioning structure of claim 2, wherein:
   the first fixing seat comprises a first planar surface perpendicular to the fixing post, a second planar surface parallel to the first planar surface, an inner spherical surface coupled to an inner edge of the first planar surface and an inner edge of the second planar surface, and an outer spherical surface coupled to an outer edge of the first planar surface and an outer edge of the second planar surface;
   a portion of the inner spherical surface is recessed toward one side of the outer spherical surface to define a sliding groove; and
   an end of the first driving mechanism away from the fixing post is slidably arranged in the sliding groove.

4. The mechanical positioning structure of claim 1, wherein:
   the second positioning mechanism comprises a second fixing frame, a second guide rail arranged on a surface of the second fixing frame, and a second slider slidably arranged on the second guide rail and rotationally coupled to the second driving mechanism;
   the second driving mechanism is arranged on the second fixing frame;
   the platform is arranged on the second slider; and
   the second slider is rotationally arranged on the second driving mechanism.

5. The mechanical positioning structure of claim 4, wherein:
   the second driving mechanism comprises a second driving motor, a driving gear arranged at an output end of the second driving motor, and a gear track meshed and coupled to the driving gear;
   the gear track is arranged on a surface of the second fixing frame and extends in a same direction as the second guide rail;
   the second slider is rotationally arranged at an output end of the second driving motor;
   the second driving motor drives the driving gear to rotate and mesh with the gear track, thereby driving the platform on the second slider to move along the second guide rail.

6. The mechanical positioning structure of claim 1, wherein:
   the first driving mechanism comprises a first driving motor arranged on the fixing post, a first gear arranged on an output end of the first driving motor, a second gear arranged on the first positioning mechanism, a connecting rod, and a transmission rod;
   one end of the connecting rod is arranged on the second gear, and another end of the connecting rod is arranged on the second positioning mechanism;
   the transmission rod is fixed on the fixing post, and two ends of the transmission rod are respectively meshed and engaged with the first gear and the second gear;
   the first driving motor drives the transmission rod to rotate through the first gear to drive the second gear to drive the second positioning mechanism to rotate around the fixing post.

7. The mechanical positioning structure of claim 6, wherein:
   two ends of each of the first gear, the second gear, and the transmission rod are 45° helical gears.

8. The mechanical positioning structure of claim 1, wherein:
   the fixing post comprises a fixing post body and bearings respectively arranged at two ends of the fixing post body.

9. The mechanical positioning structure of claim 8, wherein:
   the fixing post body is a hollow columnar structure;
   a middle of the fixing post body is provided with a hollow cavity;
   the first driving mechanism is arranged in the hollow cavity and extends from an opening of the hollow cavity.

10. A mechanical positioning structure comprising:
    a first positioning mechanism;
    a fixing post arranged through a central axis of the first positioning mechanism;
    a first driving mechanism, one end of the first driving mechanism fixed on the fixing post, and another end of the first driving mechanism slidably arranged on the first positioning mechanism;
    at least one second positioning mechanism, each of the second positioning mechanisms rotationally arranged on the fixing post and coupled to the first driving mechanism, the second positioning mechanism being an arc structure arranged outside the first positioning mechanism and protruding away from the first positioning mechanism;

a second driving mechanism arranged on the second positioning mechanism; and a platform arranged on the second driving mechanism; wherein:

the first driving mechanism is used to drive the second positioning mechanism to move on a surface of the first positioning mechanism and rotate the second positioning mechanism around the fixing post; and the second driving mechanism is used to drive the platform to move on the second positioning mechanism.

11. The mechanical positioning structure of claim 10, wherein:

the first positioning mechanism is a hollow partial spherical structure.

12. The mechanical positioning structure of claim 11, wherein:

the first positioning mechanism comprises a first fixing frame arranged on the fixing post, a first fixing seat arranged on the first fixing frame, a first guide rail arranged on an outer wall of the fixing seat, and a first slider slidably arranged on the first guide rail; and the second positioning mechanism is arranged on the first slider.

13. The mechanical positioning structure of claim 12, wherein:

the first fixing seat comprises a first planar surface perpendicular to the fixing post, a second planar surface parallel to the first planar surface, an inner spherical surface coupled to an inner edge of the first planar surface and an inner edge of the second planar surface, and an outer spherical surface coupled to an outer edge of the first planar surface and an outer edge of the second planar surface;

a portion of the inner spherical surface is recessed toward one side of the outer spherical surface to define a sliding groove; and an end of the first driving mechanism away from the fixing post is slidably arranged in the sliding groove.

14. The mechanical positioning structure of claim 13, wherein:

the second positioning mechanism comprises a second fixing frame, a second guide rail arranged on a surface of the second fixing frame, and a second slider slidably arranged on the second guide rail and rotationally coupled to the second driving mechanism;

the second driving mechanism is arranged on the second fixing frame;

the platform is arranged on the second slider; and the second slider is rotationally arranged on the second driving mechanism.

15. The mechanical positioning structure of claim 14, wherein:

the first driving mechanism comprises a first driving motor arranged on the fixing post, a first gear arranged on an output end of the first driving motor, a second gear arranged on the first positioning mechanism, a connecting rod, and a transmission rod;

one end of the connecting rod is arranged on the second gear, and another end of the connecting rod is arranged on the second positioning mechanism;

the transmission rod is fixed on the fixing post, and two ends of the transmission rod are respectively meshed and engaged with the first gear and the second gear;

the first driving motor drives the transmission rod to rotate through the first gear to drive the second gear to drive the second positioning mechanism to rotate around the fixing post.

16. The mechanical positioning structure of claim 15, wherein:

two ends of each of the first gear, the second gear, and the transmission rod are 45° helical gears.

17. The mechanical positioning structure of claim 16, wherein:

the second driving mechanism comprises a second driving motor, a driving gear arranged at an output end of the second driving motor, and a gear track meshed and coupled to the driving gear;

the gear track is arranged on a surface of the second fixing frame and extends in a same direction as the second guide rail;

the second slider is rotationally arranged at an output end of the second driving motor;

the second driving motor drives the driving gear to rotate and mesh with the gear track, thereby driving the platform on the second slider to move along the second guide rail.

18. The mechanical positioning structure of claim 17, wherein:

the fixing post comprises a fixing post body and bearings respectively arranged at two ends of the fixing post body.

19. The mechanical positioning structure of claim 18, wherein:

the fixing post body is a hollow columnar structure;

a middle of the fixing post body is provided with a hollow cavity;

the first driving mechanism is arranged in the hollow cavity and extends from an opening of the hollow cavity.

\* \* \* \* \*